June 21, 1932.     G. M. KRIEGBAUM ET AL     1,864,309
DRIVE CONTROL FOR PLANTERS
Filed Jan. 14, 1931     2 Sheets-Sheet 1
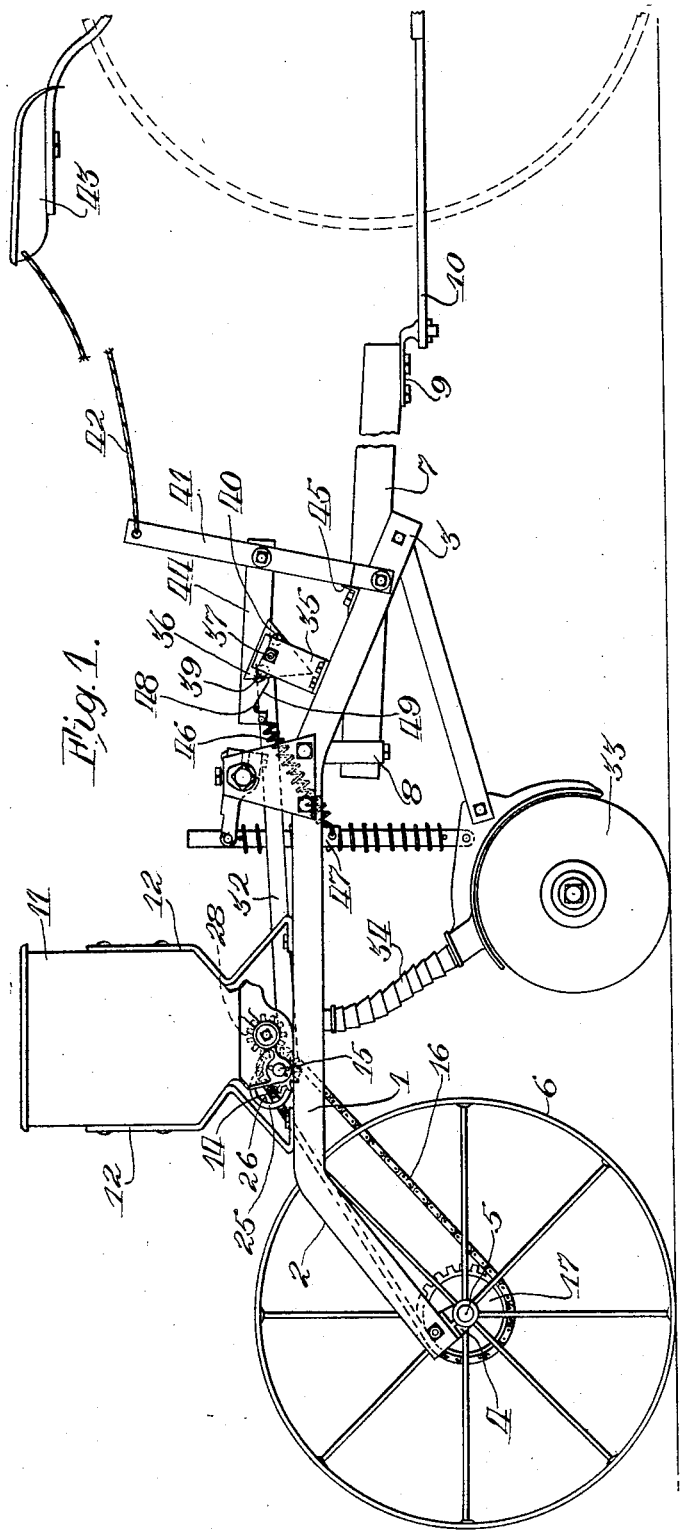
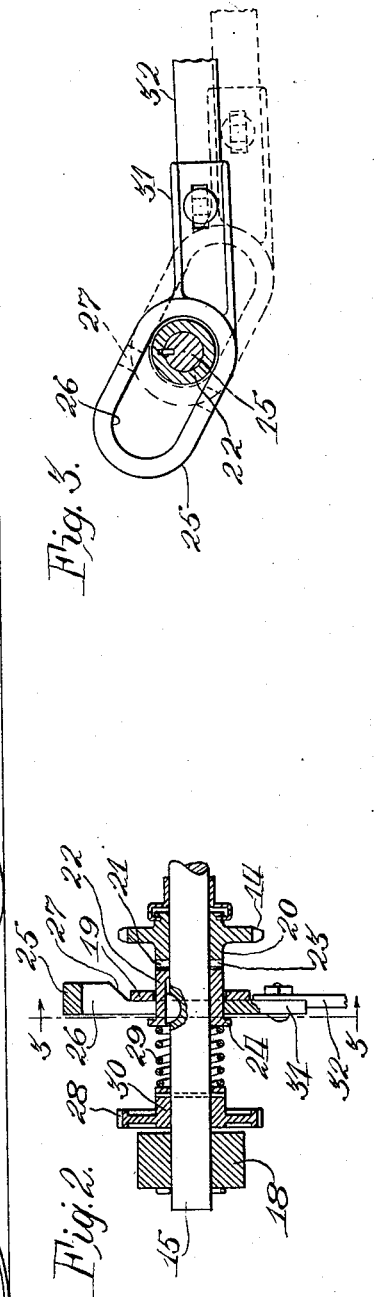
Inventors
George M. Kriegbaum
and David M. Morris
By H. Doolittle
Atty.

June 21, 1932. G. M. KRIEGBAUM ET AL 1,864,309
DRIVE CONTROL FOR PLANTERS
Filed Jan. 14, 1931   2 Sheets-Sheet 2
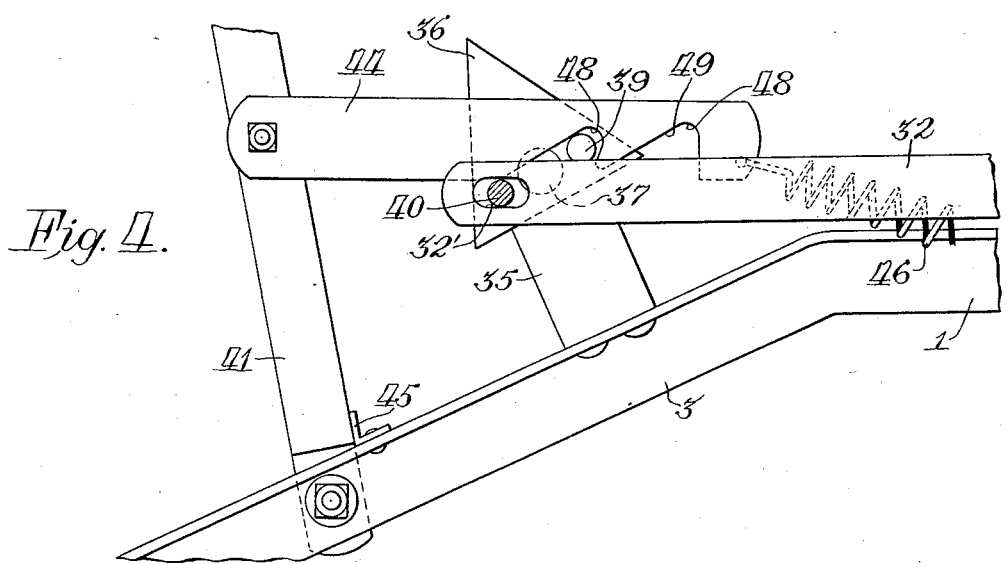
Fig. 4.
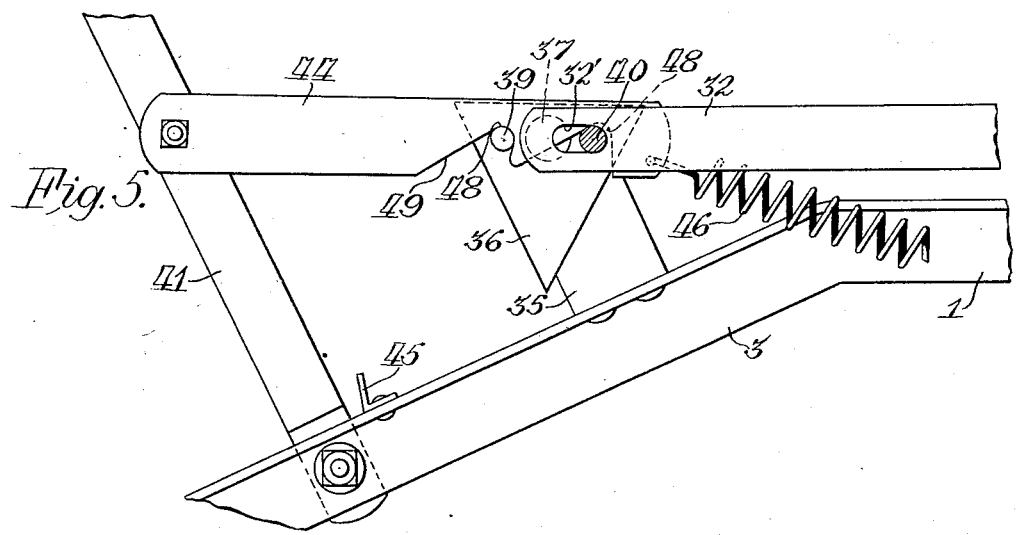
Fig. 5.
Fig. 6.
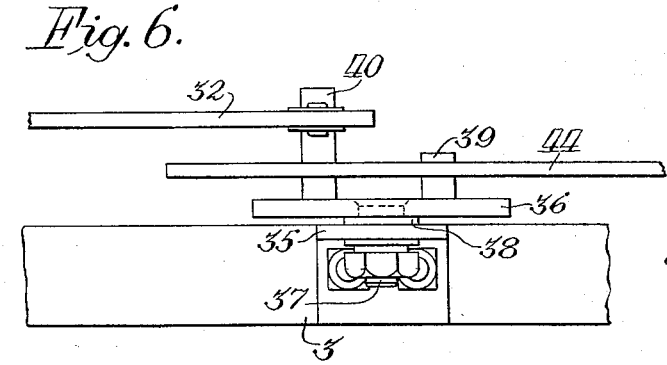
Inventor
George M. Kriegbaum
and David M. Morris
By
Atty.

Patented June 21, 1932

1,864,309

UNITED STATES PATENT OFFICE

GEORGE M. KRIEGBAUM AND DAVID M. MORRIS, OF RICHMOND, INDIANA, ASSIGNORS TO INTERNATIONAL HARVESTER COMPANY, A CORPORATION OF NEW JERSEY

DRIVE CONTROL FOR PLANTERS

Application filed January 14, 1931. Serial No. 508,740.

This invention relates to an actuating device of a ratchet type.

More specifically it relates to a remotely controlled device for positively transmitting in succession opposing movements of translation to an operating lever. The operating lever is particularly adaptable for throwing a clutch mechanism in and out of gear.

The object of the invention is to provide an improved actuating device, simple in construction and positive and dependable in operation.

Another object is to construct a device of this type which may be remotely controlled and which carries an indicator for showing the relative position in the operating cycle.

These objects and others which may be apparent are accomplished by the device illustrated in the drawings and described in the detailed description to follow.

Referring to the drawings:

Figure 1 is a side elevation of a grain drill, the clutch operating mechanism of which embodies the invention;

Figure 2 is a sectional view showing a clutch for throwing the seeding mechanism of the drill and associated parts into and out of gear;

Figure 3 is a section on the line 3—3 of Figure 2;

Figures 4 and 5 are fragmentary elevations showing the ratchet actuating mechanism in different positions of its movement; and, Figure 6 is a plan view of the element shown in Figures 4 and 5.

The grain drill illustrated is of a type particularly adapted to be drawn by a tractor. A main frame structure carries the seeding and drill mechanism. The frame structure is not shown completely, as it is not a part of this invention and will be described only sufficiently to form a basis for describing the positioning of the elements making up the invention and associated parts.

A side bar having a central, horizontal portion 1 and downwardly extending end portions 2 and 3 is one of the principal elements of the frame structure. The rear end portion 2 is secured to a casting 4 which is mounted on an axle 5 carrying a wheel 6. A stub tongue 7 is secured by a support 8 and other suitable means, not shown, to the frame structure at the forward end. A hook member 9 rigidly secured to the forward end of the tongue 7 forms a means for securing said tongue to the drawbar 10 of a tractor.

A hopper 11 is mounted by means of brackets 12 above the horizontal portion of the frame structure. Seeding mechanism of a conventional type is mounted at the bottom of the hopper. A sprocket wheel 14 mounted on a shaft 15 is operatively connected by a chain 16 to a sprocket 17, mounted on the wheel 6. The shaft 15 extends through a casting 18 and a plate 19, both of which are rigidly mounted with respect to the frame structure. The sprocket 14 has a hub extension 20 provided with a positive clutch engaging face 21. A sleeve 22 mounted on the shaft 15 has a similar mating clutch face 23 adapted to engage the face 21. The sleeve 22 at the end opposite the clutch face has a laterally extending flange 24, said flange being in spaced relation to the member 19.

A clutch operating collar 25, best shown in Figure 3, has an opening 26 therein of a width sufficient to slide freely over the sleeve 22 and of a length approximately twice the diameter of said sleeve to provide for an in and out position. The thickness of the collar 25, clearly shown in Figure 2, is much wider at one end than at the other, the difference in thickness being sufficient to disengage the clutch faces 21 and 23. A cam surface 27 connects the portions of different thicknesses. A gear 28, rigidly pinned on the shaft 15, is adapted to drive the seeding mechanism of the drill. A compression spring 29 abutting the hub 30 of the gear 28 and the flange 24 of the sleeve 22 is provided for engaging the clutch faces 21 and 23.

The clutch operating collar 25 has an extension 31 secured to a link 32, which is actuated, as will hereinafter be described, for putting the clutch in and out of gear.

A furrow opening disk 33 is mounted for operation below the frame structure in a conventional manner. A tube 34 delivers seed from the seeding mechanism to the furrow opening means.

A bracket 35 is rigidly mounted on the forward portion 3 of the frame member. Said bracket extends vertically above the said member. A triangular plate member 36 is pivotally mounted on the bracket 35 for rotation about a horizontal axis. Figures 4 and 5 show the mounting of the plate member. A bolt 37 extends through the plate member, through a washer 38 to space said member from the bracket 35, and through said bracket.

The plate member 36 is triangular in shape and is pivoted at a point midway of one of its sides and spaced from said side. A short pin 39 is rigidly secured to the plate 36 and extends outwardly from the side opposite the bracket 35 at right angles to said member. A similar pin 40, considerably longer than the pin 39, is similarly mounted on the plate member 36 diametrically opposite the pin 39 with respect to the pivot axis of the plate member and at an equal distance from said axis. The link 32 extending from the clutch operating collar, is provided with a slot 32′ through which the pin 40 extends. The pin 40 is keyed to prevent axial movement of the link 32. The slot 32′ is slightly larger in width than the diameter of the pin 40 and is about twice as long as said diameter, thereby providing for limited longitudinal movement of the pin with respect to the bar. An operating lever 41 is pivoted to the forward end of the portion 3 of the frame member on an axis parallel to the axis of the plate member 36. A rope 42 secured to the top of the lever 41, is adapted to extend to the seat 43 of the tractor within reach of the operator. An actuating link 44 is pivotally connected to the lever 41 intermediate its ends on an axis parallel to the axis of the plate member 36. The link 44 extends substantially horizontally over the pins 39 and 40 on the plate member 36. A stop 45 is positioned on the portion 3 of the frame member to the rear of the lever 41 to limit its rearward movement. A spring 46 attached to the end of the link 44 extends downwardly and rearwardly and is attached to a bracket 47 on the frame structure.

The link 44 is provided with a pair of notches 48 of a particular construction. The notches 48 extend upwardly into the link 44 a substantial distance. In the direction toward the operating lever 41 comparatively long, straight, cam-like surfaces 49 extend to the lower edge of the link. The uppermost portions of the notches are shaped to fit the pins 39 and 40 and are spaced apart the same distance as said pins.

In the operation of this device the position shown in Figure 4, with the triangular indicator pointed upwardly, will be first considered. As the pins 39 and 40 are on a line extending through the pivot point of the triangular member, the particular direction in which the point of said member is extending does not have any bearing on the operation of the device. The action each 180° is exactly similar. The triangular member is so shaped merely to provide means for indicating the position of the longer pin 40, on which the link 32 is pivoted. For the purpose of explaining the operation of the device the direction in which the point of the triangular member is extending may be ignored.

With the elements of the device in position, as shown in Figure 4, tension applied to the rope 42 moves the operating lever 41 forwardly towards the tractor. With this movement of said lever the notch 48 is brought forward into engagement with the pin 39. As the line of centers of said pin and the pivot point of the link 44 on the lever 41 is above the pivot point of the member 36 torque is applied to said member and it is rotated until the pin 40 has moved around until it has seated in the second notch 48 at the end of the link, as shown in Figure 5. It will be noted that the center line through the pins 39 and 40 extends through the pivot point of the link 44 on the lever 41. In other words, the member 36 may be considered as being on dead center. The pin 40, during the operation described, moves to the rearward end of the slot 32′ and moves the link 32 rearwardly, thereby allowing the spring 29 to move the sleeve 22 axially on the shaft 15, whereby the clutch is engaged.

Starting with the elements in the position shown in Figure 5, when the rope 42 is released the spring 46 pulls the operating lever rearwardly until it abuts the stop 45. During this movement of the lever 41 the link 44 moves rearwardly with the surfaces 49 of the notches, sliding over the pins 39 and 40 with a cam-like movement. The spring 46, extended downwardly as well as rearwardly, holds the link 44 engaged with the pins 39 and 40. As the link reaches a position where the rear-most pin reaches the lower edge of the cam surface of the rear notch, said pin slides over into the forward notch and a position is obtained similar to the position in Figure 4, with the rear-most pin slightly spaced from the bottom of the forward notch. When the pin drops into the notch, as described, the member 36 has a small angular movement. During such movement the pin 40, which is in the rearward position, moves forwardly in the slot 32′ into a position intermediate of the slot similar to the position shown in Figure 4. The provision of the slot 32′ for this purpose makes it unnecessary for the spring 46, while returning the lever 41, to perform any work on the link 32. This is an important feature of the invention as considerable resistance may be encountered by the link 32 in the operation of the clutch. At the other end of the stroke of the link 32 the slot 32' performs the same function, the pin 40 moving rearwardly in the slot as shown in Figure 4. By this construction and by so constructing and positioning the parts that the center line through the pins 39 and 40 also passes through the pivot point of the link 44 on the lever 41, all the force exerted on the link 32 is performed by forward tension on the rope 42; the spring 46 acts only to return the mechanism for another cycle of the operation.

It will be understood that during each cycle of operation the member 36 moves through approximately 180° and that the link 32 is alternately reciprocated in opposite directions. The particular type of mechanism shown in detail is to be considered as a preferred form and applicant limits his invention only by the scope of the appended claims.

What is claimed is:

1. A ratchet type device comprising a crank carrier member mounted for rotation on a frame structure, a pair of cranks mounted on said carrier and diametrically spaced from the axis of rotation, a link mounted for reciprocation above the cranks, resilient means for urging the link in one direction, means for positively moving the link in the opposite direction, and a notch formed in said link, said notch having a cam-like edge slanting downwardly in a direction opposite the direction of action of the resilient means whereby said notch engages a crank and rotates the carrier member approximately a half revolution when the link is positively moved in one direction until the second crank contacts with the link, the resilient means returning the link to its original position with the slanting edge of the notch sliding over the engaged crank.

2. A ratchet type device comprising a crank carrier member mounted for rotation on a frame structure, a pair of diametrically positioned cranks mounted on said carrier at spaced distances from the axis of rotation, a link mounted for reciprocation above the cranks, a spring connected to said link and adapted to urge the link in one direction, and a notch formed in said link, said notch having a cam-like edge slanting in a direction opposite the direction of the spring tension whereby said notch engages a crank and rotates the carrier member approximately a half revolution when the link is moved in one direction until the second crank contacts with the link, the spring returning the link to its original position with the slanting edge of the notch sliding on the engaged crank.

3. A ratchet type device comprising a crank carrier member mounted for rotation on a frame structure, a pair of cranks mounted on said carrier at spaced distances from the axis of rotation and diametrically opposite therefrom, a link mounted for reciprocation above the cranks, a spring connected to said link and adapted to urge the link in one direction and to press it resiliently against the cranks, a notch in said link spaced from the end thereof a distance greater than the distance between the two cranks, said notch having a cam-like edge slanting in a direction opposite the direction of the spring tension whereby said notch engages a crank and rotates the carrier member approximately a half revolution when the link is moved in one direction until the link contacts with the second crank, the spring returning the link to its original position with the slanting edge of the notch sliding on the engaged crank.

4. A ratchet type device comprising a crank carrier member mounted for rotation on a frame structure, a pair of diametrically opposite cranks mounted on said carrier at spaced distances from the axis of rotation, a link mounted for reciprocation above the cranks, a spring connected to said link and adapted to urge the link in one direction and to press it resiliently against the cranks, a notch in said link of a size sufficient to engage either of said cranks, said notch having a cam-like edge slanting in a direction opposite the direction of the spring tension, and an engaging edge at the opposite side whereby said notch engages the cranks successively and rotates the carrier member when the link is reciprocated, said link being formed with a second notch beyond the first notch into which the second crank passes whereby the carrier member is rotated approximately a half revolution during each cycle of operation of the link.

5. A ratchet type device comprising a crank carrier member mounted for rotation on a frame structure, a pair of cranks mounted on said carrier at spaced distances from the axis of rotation, one of said cranks being substantially longer than the other, an actuated lever pvoted to the outer end of the longer crank whereby the carrier member can be rotated with the shorter crank clearing said lever, a link mounted for reciprocation above the cranks, a spring connected to said link and adapted to urge the link in one direction and to press it resiliently against the cranks, a notch in said link of a size sufficient to engage either of said cranks, said notch having a cam-like edge slanting in a direction opposite the direction of the spring tension, and an engaging edge at the opposite side whereby said notch engages a crank and rotates the carrier member when the link is moved in one direction, the spring returning the link to its original position with the slanting edge of the notch sliding on the engaged crank.

6. A ratchet type device comprising a carrier and indicator member mounted for rotation on a frame structure, a pair of crank pins mounted on said carrier at equal distances from the axis of rotation, one of said cranks being substantially longer than the other, an actuated lever pivoted to the outer end of the longer crank whereby the carrier may be rotated with the shorter pin clearing the lever, a link mounted for reciprocation above the cranks, an actuating lever pivoted to one end of said link, a tension spring connected to the other end of the link and extending at an angle downwardly therefrom whereby the link is urged in the direction away from the actuating lever and against the crank pin, a notch in said link spaced from the free end a distance greater than the distance between the crank pins, said notch having a cam-like edge slanting in the direction toward the actuating lever, and an engaging edge at the opposite side of the notch whereby said notch engages a crank pin and rotates the carrier member when the link is moved in one direction, the spring returning the link to its original position by sliding the slanting edge over the crank pin.

7. A ratchet type mechanism adapted to throw a clutch mechanism in and out of gear comprising a supporting structure, an actuating lever pivotally attached to said structure, a bracket rigidly attached to said structure spaced from the lever and extending in the same direction, a rotatable member pivotally mounted on said bracket on an axis parallel to the axis of the actuating lever, a stub shaft rigidly mounted on said member at a point spaced from the axis and parallel thereto, a second shaft longer than the first named shaft rigidly attached to said member in a position diametrically opposite the first named shaft and at an equal distance from the axis of said member, an actuated link pivotally connected at the end of the longer shaft, an actuating link pivotally connected to the actuating lever and extending across the shafts on the rotatable member, a pair of spaced notches in the end of the actuating link adapted to engage the shafts successively and to rotate said member approximately a half revolution for each movement of the actuating lever.

In testimony whereof we affix our signatures.

GEORGE M. KRIEGBAUM.
DAVID M. MORRIS.